May 9, 1933.   B. L. ARMSTRONG   1,907,705
CONTROL SYSTEM
Filed May 11, 1929   3 Sheets-Sheet 1
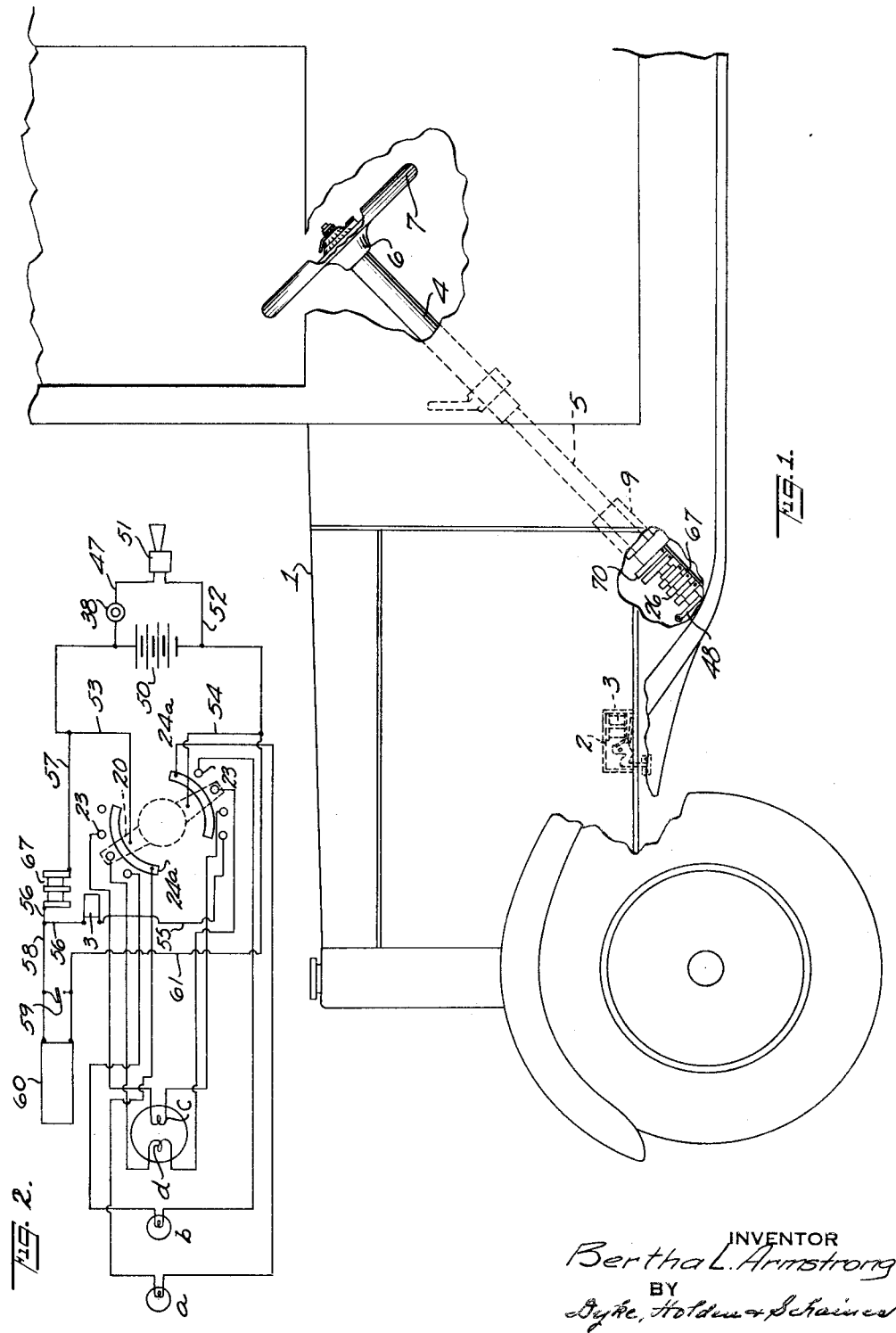
INVENTOR
Bertha L. Armstrong
BY
Dyke, Holden & Schaired
ATTORNEYS May 9, 1933.  B. L. ARMSTRONG  1,907,705
CONTROL SYSTEM
Filed May 11, 1929   3 Sheets-Sheet 2
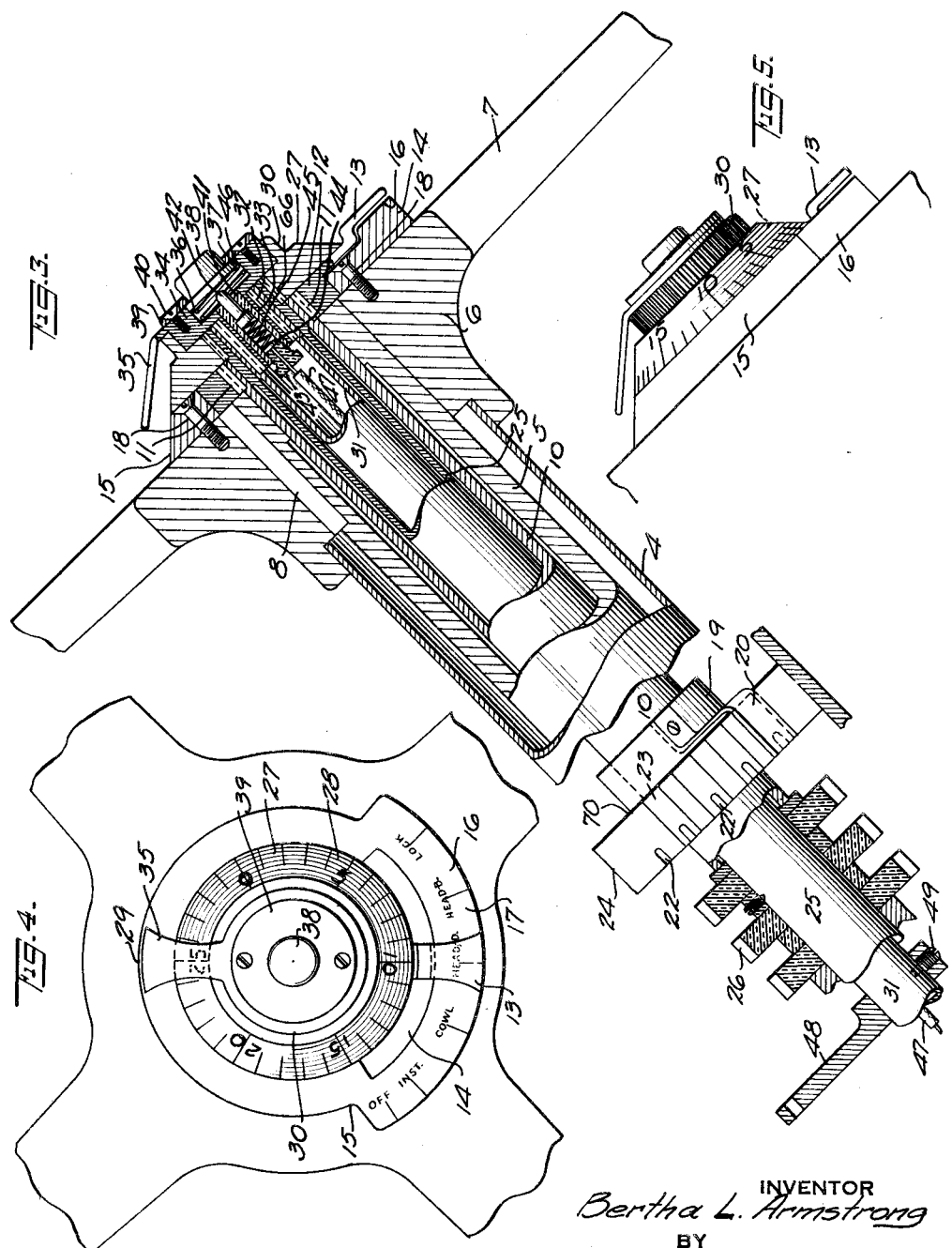
INVENTOR
Bertha L. Armstrong
BY
Dyke, Holden & Schaines
ATTORNEYS May 9, 1933.  B. L. ARMSTRONG  1,907,705
CONTROL SYSTEM
Filed May 11, 1929  3 Sheets-Sheet 3
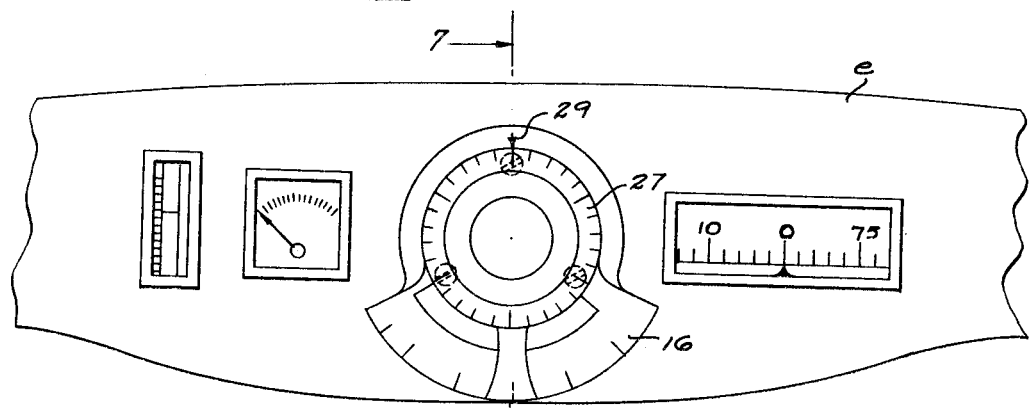
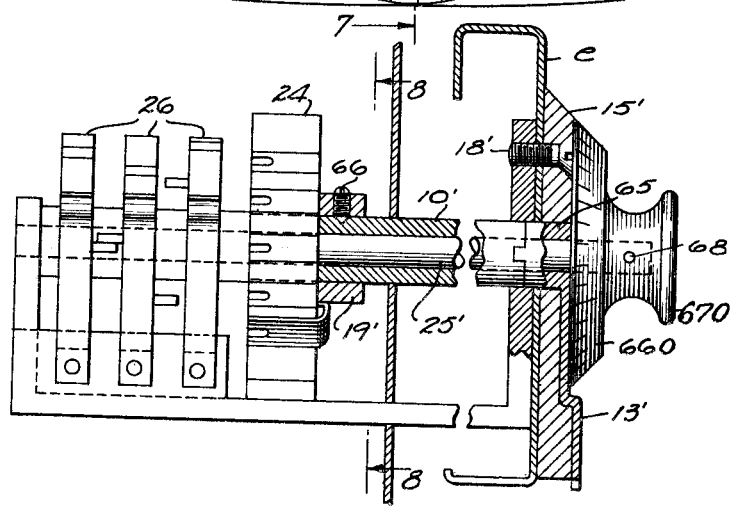
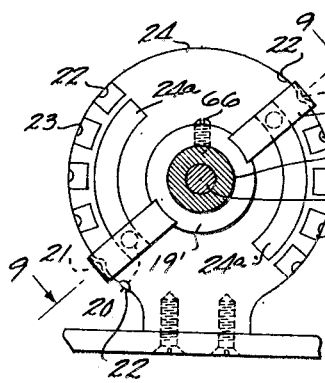
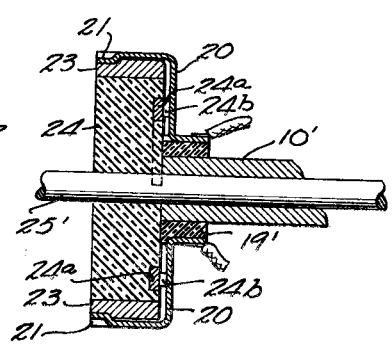
INVENTOR
Bertha L. Armstrong
BY
Dyke, Holden & Schaires
ATTORNEYS Patented May 9, 1933

1,907,705

UNITED STATES PATENT OFFICE

BERTHA LOUISE ARMSTRONG, OF WESTFIELD, NEW JERSEY

CONTROL SYSTEM

Application filed May 11, 1929. Serial No. 362,441.

My invention relates to control systems for vehicles driven by internal combustion motors, and has been more particularly designed for use in automobiles, although obviously it may be used in motor boats, aeroplanes, etc., which are included by the term vehicle as used herein.

In vehicles of this class it is important that means be provided whereby the motor cannot be started by anyone except the owner or other person having proper authority and accordingly it has been proposed in U. S. Patent No. 1,185,690, granted June 6, 1916, to place in series with the motor ignition apparatus an electric switch constructed on the principle of a combination lock whereby the ignition circuit cannot be closed unless the dial be manipulated in accordance with a definite combination and then only while the dial remains in its circuit closing position. Such a switch is hereinafter termed a combination lock switch.

It has also been proposed to apply a lock to the motor hood of an automobile, said lock being releasable only upon the energizing of an electromagnet whereby the hood cannot be opened by unauthorized persons, see U. S. Patent No. 1,417,430, granted May 23, 1922.

According to the present invention a combination lock switch and hood lock are so combined that the hood lock protects the wiring and contacts of the combination lock switch, and also preferably although not necessarily the latter protects the hood lock by making it impossible to energize the same unless the combination is properly manipulated for the closing of the ignition circuit.

The switch for the energizing of the hood lock magnet hereinafter termed the hood lock switch is preferably although not necessarily combined in a mechanical sense with the combination lock switch.

The invention also includes the provision of an electric starter for the motor connected to the battery through the combination lock switch in such manner that the starting circuit will be closed as the switch is brought into its unlocking position.

The combined combination lock and hood lock switches may if desired be mounted on the instrument board of the vehicle, but I prefer to mount the same upon the steering wheel and concentric therewith, and to combine the same in a mechanical sense with the steering column and one or more of the following controls, viz., a throttle rod and lever, a lighting switch, and a push button for sounding the horn or alarm.

The invention also includes various details of construction which will be pointed out and claimed.

It should be understood that the invention may be embodied in numerous modifications of the structures herein shown which are inserted for illustration and not for limitation of the scope of the invention.

Referring to the accompanying drawings, Figure 1 is a side elevation partly broken away of the forward portion of an automobile equipped with my improved control device.

Fig. 2 is a diagram of the wiring.

Fig. 3 is a side elevation partly in section of the steering column and a part of the wheel of Fig. 1.

Fig. 4 is a plan of the wheel of Fig. 3 and parts mounted thereon.

Fig. 5 is a side elevation of the parts shown in Fig. 4.

Fig. 6 is a plan of an instrument board upon which is mounted the hand actuated members of my combined lighting, hood lock and combination lock switches.

Fig. 7 is a section on line 7—7 of Fig. 6.

Fig. 8 is a section on line 8—8 of Fig. 7, and Fig. 9 is a section on line 9—9 of Fig. 8.

The automobile shown is of usual form and comprises the usual internal combustion motor (not shown) protected by the usual metal hood 1 the sides of which may be raised to give access to the motor.

In order to prevent unauthorized opening of the hood each of said sides is normally locked in closed position by a lock 2 one form of which is shown in said U. S. Patent No. 1,417,430. The lock 2 comprises an electromagnet 3 which may be energized by the closing of a circuit to be described later. When so energized the locking latch is released and the hood may be opened. The circuit referred to may be opened as soon as the hood is unlocked and when the hood is closed the lock by suitable spring action again secures the hood in such position. Or, if desired the circuit may remain closed while the hood is open and until it is closed and then upon the opening of the circuit the lock may operate to secure the hood.

The automobile is provided with a steering column which comprises the usual tubular support 4 fixed to the body and four tubular rods or shafts rotatably and concentrically mounted one within another as shown in Fig. 3. The outermost shaft 5 is keyed at its upper end to the hub 6 of the steering wheel 7, by means of the key 8. The lower end of said shaft is provided with the usual means for operating the steering gear 9.

Within the shaft 5 is a second tubular shaft 10, which at its upper end is keyed by keys 11 to the ring or collar 12. The ring 12 has an integral arm 13 which occupies a sector-shaped recess or depression 14 formed in the plate 15, the extremity of said arm being bent as shown to overlie the sector portion 16 of said plate in which the indicia 17 are stamped. The plate 15 is rigidly secured to the hub 6 by screws 18, and forms a bearing for the ring 12.

The lower end of shaft 10 is provided with an insulating sleeve 19 to which are secured a pair of oppositely disposed spring contact arms 20 of a switch 70. One end of each of said arms is secured to the sleeve 19, and the arm is bent as shown in Fig. 9 so that the free end is parallel to the axis of said shaft 10. The spring arm ends are stamped to form detents 21 which are adapted to engage depressions 22 some of which are formed in the insulating support 24 and some in the contact bars 23. These bars are in pairs 180° apart and occupy grooves or recesses formed in the insulating support 24 to which they are secured. Upon one face of said support are secured a pair of arcuate contact plates 24$^a$ adapted to supply current to the instrument board and tail lights when contacted by buttons 24$^b$ carried by the arms 20. The support 24 is secured by any suitable means to the chassis, and it is obvious that as shaft 10 is rotated the arms 20 will move from "off" position and make contact first with the plate 24$^a$ and thereafter, while maintaining such contact, with the various pairs of bars 23, the detents 21 snapping into the recesses 22 to hold the switch arms in their various positions.

Within the shaft 10 is a third tubular shaft 25 which at its upper end is keyed by keys 66 to the dial member 27 of the combination lock switch. This member is provided with a conical surface having indicia 28 adapted to cooperate with a mark 29 on fixed plate 15, and there is a knurled flange 30 integral with dial member 27 for convenience in turning same.

Upon the lower end of shaft 25 are the contact members 26 of the combination lock switch 67 which may be constructed as fully disclosed in U. S. Patent No. 1,185,690 previously referred to. It should be noted that these contact members are situated within the body of the vehicle and cannot be reached except by raising one side of the hood 1. Consequently they are protected by the lock 2 against being tampered with, and as will be shown the circuit for controlling the hood lock is itself protected by the combination lock switch, so there is very complete protection.

Within the shaft 25 is a fourth tubular shaft 31 which at its upper end is keyed by keys 32 to a tubular flange or sleeve 33 formed integral with a cup-shaped member 34. An integral arm 35 extends outwardly from said member 34. The recess 36 of member 34 forms a seat for a coil spring 37 and push button 38, the latter being retained against displacement by a plate 39 secured to the member 34 by screws 40.

It should be noted that while one may if desired connect the hood lock magnet 3 across oppositely disposed contact bars 23 so as to be operable by the switch arms 20 independently of the combination lock switch 67, it is preferable to connect the hood lock magnet to only one of the contact bars 23 through conductor 55 as shown, and to complete the circuit through the magnet, conductor 56 and switch 67. By such connection it is possible to energize the magnet 3 only when the combination lock switch 67 has been operated to connect the wire 56 with wire 57 leading to the battery.

The combination lock switch 67 also controls the application of current through wire 58 to the motor ignition device 59 and starter 60, which are connected with the battery through the return wire 61, as shown.

The operation of the device is as follows: Assuming the motor to be at rest and the switches 70 and 67 in off position, the driver may by operating the switch arm 13 and shaft 10 turn on any of the lights but cannot operate the hood lock. In order to start the car he manipulates the rotary contact members 26 of the combination lock switch by means of knurled flange 30, dial 27 and shaft 25 until in accordance with the combination they are brought into position for connecting wire 57 with 56. Such connection energizes the starter 60 and motor ignition device 59 and causes the motor to start, it being understood that the throttle has been suitably opened either by the usual foot control or by operating the hand lever 35 and shaft 31.

After the motor has started the starter will be automatically cut off by any suitable means which are well known.

Whenever the contact members 26 are in the position described the hood lock magnet 3 may be energized by movement of switch arms 20 to suitable position and the hood will thereupon be unlocked.

In order to stop the car, the dial 27 is turned to open the connection between wires 57 and 56. If turned very slightly the circuit will be opened and can be closed by immediately returning the dial to its "on" position. In case the dial is turned through a considerable angle the circuit can be closed only by manipulating the dial in accordance with the combination.

It should be noted that in the structure of Fig. 3 I have combined with the usual wheel and steering column a combination lock switch for controlling the starting of the car and preferably also a hood lock, a hand switch for turning on and off various lighting combinations and for operating the hood lock, a hand throttle lever and a horn push button. Such a concentration of control means is of great advantage in the operation of the car since it simplifies and facilitates the control thereof.

It is possible however to obtain many of the advantages of my invention by mounting the switch mechanism upon a fixed part of the car, for example the instrument board $e$ as in Figs. 6 to 9.

In this construction, the plate 15' which is similar in form to the plate 15 previously described is secured by screws 18' to the instrument board and there is a hollow shaft 10' rotatably mounted on a spindle 25'. The shaft 10' is provided with an insulating sleeve or collar 19' held by a set screw 66 and to which the spring arms 20 are secured. These arms and switch parts associated therewith are the same as those previously described.

The shaft 10' is united by mortise and tenon with a sleeve 65 rotatable on spindle 25' and having an integral arm 13' as shown. Upon the rear end of the spindle 25' a dial member 660 having a knob 670 is secured by a pin 68. The spindle 25' carries at its forward end the contact members 26 of the combination lock switch constructed and operating as hereinbefore described. The switch members 24 and 26 are preferably situated within the motor hood 1 so as to be protected by the lock 2.

Among the advantages of my invention is the minimizing of fire risk due to short circuits in the electrical system, by placing the switches for controlling the ignition device, starter, hood lock and lights under the hood, so that not only is all wiring for such parts removed from the body and instrument board, but such switches are in a well protected substantially fire proof enclosure. Furthermore the length of the wires necessary for making the various connections is considerably reduced, and the necessity for passing them through areas where short circuits might be likely to occur is eliminated.

Having now described my invention what I claim is:

1. In a vehicle, a combustion motor, a protective hood thereover having an electrically releasable lock, a combination lock switch having contact members within said hood for controlling the motor ignition circuit, and a switch for controlling said releasable lock, said switches comprising rotatable operating members in concentric relation to each other.

2. In a vehicle, a combustion motor, a protective hood thereover having an electrically releasable lock, a combination lock switch having contact members within said hood for controlling the motor ignition circuit and said releasable lock, and a second switch for controlling said releasable lock, said switches comprising rotatable operating members in concentric relation to each other.

3. In a device of the character described, steering gear and means for operating same comprising a shaft and hand member rigid therewith, an electrically controlled hood lock, an electric lighting circuit, and a pivotal switch concentric with said shaft for controlling said hood lock and for closing said circuit.

4. In a motor vehicle, a plurality of concentric relatively rotatable members, each member having at the same end manually operable control means, and the opposite ends of said members having switch means associated therewith for controlling the ignition and lighting circuits, said switch means being located within the hood of the vehicle, and means for locking said hood electrically controlled by both of said switch means.

5. In a motor vehicle, electrical means for locking the hood, ignition means, a switch for controlling the circuits of said electrical locking and ignition means, lighting circuits, and a switch for controlling said lighting circuits and also controlling the circuit of the locking means.

6. In a motor vehicle, electrical locking means for the hood, ignition means, a switch for controlling the circuits of said several means, and a second switch for controlling the circuit of said locking means.

7. In a motor vehicle, an electrically releasable lock, ignition means, a combination lock switch for controlling the lock and ignition means, and a second switch for controlling the circuit of the lock.

8. In a vehicle, a starter, ignition means, hood locking means, a combination lock switch for controlling the circuits of said several means, lighting circuits, and switch means for controlling said lighting circuits, said last named means also controlling the circuit of said hood locking means.

9. In a vehicle, ignition means, hood locking means, a switch for controlling the circuits of said several means, and preventing surreptitious operation thereof, and a multiple switch for controlling the lighting circuits independently of the position of said first named switch, said last named switch also controlling said locking means.

10. In a motor vehicle, a plurality of circuits having electrically operated devices, a switch for controlling said circuits, another circuit having an electrically operated device, and a switch for controlling the last named circuit, said second switch controlling certain of the circuits controlled by said first named switch.

11. In a motor vehicle, a protective hood thereover having an electrically releasable lock, a switch having contact members within the hood for controlling the motor ignition circuit and the circuit of said lock, and another switch for controlling the circuit of the releasable lock, said switches including operating members in concentric relation to each other.

12. In a motor vehicle, a protective hood having locking means therefor electrically operated, a switch having contact members within the hood for controlling the motor ignition circuit and the circuit of said locking means, and a second switch having contacts within said hood for controlling the circuit of said locking means and the lighting circuit, said switches including rotatable operating members in concentric relations to each other.

In testimony whereof, I have signed my name hereto.

BERTHA LOUISE ARMSTRONG.